(12) United States Patent  (10) Patent No.: US 7,987,374 B2
Xie  (45) Date of Patent: Jul. 26, 2011

(54) SECURITY CHIP

(75) Inventor: Wei Xie, Beijing (CN)

(73) Assignee: Bejing Lenovo Software Ltd., Beijing (CN)

( * ) Notice: Subject to any disclaimer, the term of this patent is extended or adjusted under 35 U.S.C. 154(b) by 937 days.

(21) Appl. No.: 11/886,762

(22) PCT Filed: Nov. 29, 2005

(86) PCT No.: PCT/CN2005/002049
§ 371 (c)(1),
(2), (4) Date: Sep. 20, 2007

(87) PCT Pub. No.: WO2006/099785
PCT Pub. Date: Sep. 28, 2006

(65) Prior Publication Data
US 2009/0037747 A1 Feb. 5, 2009

(30) Foreign Application Priority Data
Mar. 23, 2005 (CN) .......................... 2005 1 0056168

(51) Int. Cl.
*G06F 11/30* (2006.01)
*G06F 12/14* (2006.01)

(52) U.S. Cl. ........ 713/192; 713/172; 713/189; 713/194; 380/28; 380/44

(58) Field of Classification Search .................. 713/172, 713/189, 192, 194; 380/28, 44
See application file for complete search history.

(56) References Cited

U.S. PATENT DOCUMENTS

| 7,216,237 | B2 * | 5/2007 | Vanstone | 713/184 |
| 7,428,314 | B2 * | 9/2008 | Henson | 382/103 |
| 7,743,977 | B2 * | 6/2010 | Chen et al. | 235/379 |
| 2002/0016914 | A1 | 2/2002 | Seki et al. | |
| 2003/0159054 | A1 * | 8/2003 | Fauble et al. | 713/189 |
| 2004/0117616 | A1 * | 6/2004 | Silvester | 713/155 |
| 2006/0076421 | A1 * | 4/2006 | Sato | 235/492 |

* cited by examiner

*Primary Examiner* — Edan Orgad
*Assistant Examiner* — Kari L Schmidt
(74) *Attorney, Agent, or Firm* — Kinney & Lange, P.A.

(57) ABSTRACT

Two kinds of security chips having a security interface are provided. One kind of security chip comprises a processor module, an encrypt/decrypt module, a memory module, a power detecting module and a security I/O module, and all of the modules are connected with each other by an internal bus in the security chip; the other kind of security chip comprises a processor module, an encrypt/decrypt module, a memory module, a power detecting module and an I/O interface module, all of the modules being connected with each other by the internal bus in the security chip, wherein, the security chip also comprises a security input module, a security output module and a south bridge interface module, and all of the modules are connected with each other by the internal bus in the security chip. With the security chip provided by the present invention, it is possible to encrypt/decrypt the I/O information of an information processing device, ensure the safety of the I/O information, and thus prevent the information from being listened to or otherwise revealed.

9 Claims, 4 Drawing Sheets

SECURITY CHIP

BACKGROUND OF THE INVENTION

1. Field of Invention

The present invention relates to the field of computer security technology, and in particular to a security chip having a security interface.

2. Description of Prior Art

Nowadays, various information processing apparatuses have been widely used in people's daily life. So-called information processing apparatus is mainly referred to as a personal computer (PC), a notebook computer, a palm computer, a mobile phone and the like.

The organization of Trusted Computing Platform Alliance (TCPA) initiated by Intel, IBM, HP, Microsoft and Compaq in 1999 has been promoting the establishment of a trusted computing environment and defined an architecture for platform device authentication as well as specification for security chip embedded in mainboard TPM (Trusted Platform Module) and upper-layer software middleware TSS (Trusted Software Stack). In 2003, TCPA was restructured as Trusted Computing Group (TCG) and made necessary supplement to TPM and TSS.

FIG. 1 shows a schematic diagram for the structure of a security chip system required by TCG. The security chip comprises a processor module 101 for performing control, such as a micro-controller unit (MCU) processor, an encryption/decryption module 102, a storage module 103 for storing encryption/decryption keys, an input/output (IO) interface module 104 and a power detecting module 105 for detecting the power supply of the security chip. All of the modules are connected with each other via an internal bus in the security chip. The processor module 101 controls the encryption/decryption module 102 according to an instruction received from the I/O interface module 104, or sends the instruction processing result to the I/O interface module 104 according to the received instruction or retrieves secret information such as a key from the storage module 103 directly and sends it to the I/O interface module 104. The encryption/decryption module 102, under the control of the processor module 101, retrieves the pre-stored encryption/decryption keys from the storage module 103, encrypts/decrypts the received data with the encryption/decryption keys and transmits the encrypted/decrypted data to external devices via the I/O interface module 104, which serves to transmit data and/or instructions between the security chip and the external devices.

The encryption/decryption module 102 generally consists of a secure hash algorithm/hashed message authentication code (SHA/HMAC) engine module, a random number generator, a RSA processor (where RSA is not an acronym but a common reference to a public key cryptography algorithm developed by three men with last names beginning with R, S and A) module and a key generation module. The SHA/HMAC engine module which is controlled by the processor module 101 conducts SHA/HMAC operation on the received data and sends the calculated result to the I/O interface module 104. The RSA processor module, also under the control of the processor module 101, conducts RSA operation on the received data and sends the calculated result to the I/O interface module 104. The random number generator generates random numbers for random key generation under the control of the processor module 101. The key generation module generates keys required by RSA and SHA/HMAC algorithm using the random numbers generated by the random number generator. The storage module 103 is formed of a nonvolatile storage for holding key data, user data and programs and a volatile storage for saving temporal data and temporal programs.

The security chip can further include other optional components for managing the current status of the security chip.

FIG. 2 is a schematic diagram showing the connection between a security chip and a mainboard in the prior art. The CPU 201 of the information processing apparatus is connected to a north bridge 202 on the mainboard, and the north bridge 202 is connected directly to a south bridge 203 and a static RAM (SRAM) 204, respectively. The south bridge 103 is connected directly to a Super Input/Output (SuperIO) interface 205 and the security chip 206, respectively, via a LPC (Low Pin Count) bus. The primary functions of the security chip specified by TCG currently include: conducting integrity verification on BIOS during the startup of a computer and verifying the integrity for hardware devices and for operating system; monitoring and verifying the integrity for protected application software after the operating system starts running; generating and managing various keys in the system; and providing digital signature if necessary.

Although the security chip can ensure a secured running environment for the information processing apparatus, the above mentioned security chip can not guarantee the safety for input and output stages. This is caused by the fact that the security chip only monitors and verifies the existing data inside the information processing apparatus, but the data being inputted and outputted is not subjected to be monitored and verified. At present, many Trojan horse programs can monitor data entered via a keyboard, the on-screen position of a mouse and output data sent to a video card so as to acquire confidential information relevant to a user. Obviously, this is a loophole to any trusted terminal based on security chip. Consequently, the existing chip has not yet overcome the problems related to trusted input and output.

SUMMARY OF THE INVENTION

In view of the above problems, the object of the present invention is to provide two kinds of security chips each having a security interface in order to guarantee the security for information input and output of an information processing apparatus.

To achieve the above object, the inventive technical scheme is implemented as follows.

A security chip is provided, which comprises a processor module, an encryption/decryption module, a storage module, a power detecting module and a security I/O module, all of which are connected with each other via an internal bus in the security chip; wherein: said processor module controls said security I/O module to send the received data to said encryption/decryption module, controls said encryption/decryption module to perform encryption/decryption operation and transmit the operation result to said security I/O module by controlling said encryption/decryption module, or controls said storage module to stores the encryption/decryption key generated by said encryption/decryption module; said security I/O module is configured to receive input data from an external device and, under the control of said processor module, to send the received data to said encryption/decryption module or to transmit the data from said encryption/decryption module to said external device; said storage module is configured to store the encryption/decryption key; said encryption/decryption module, under the control of said processor module, retrieves the encryption/decryption key pre-stored in said storage module, encrypts/decrypts the received data with the encryption/decryption key and transmits the encrypted/decrypted data to said security I/O module, or it generates the key required for encryption/decryption; and said power detecting module is controlled by said processor module to detect the power supplied to the security chip.

Preferably, when said security chip is positioned within an input device, said security I/O module acquires unencrypted data output by the input device and sends the acquired data to said encryption/decryption module, or transmits the encrypted data from said encryption/decryption module to the external device.

Said security I/O module preferably comprises a universal serial bus (USB) security I/O module connected directly to an input device having a USB interface, a non-USB security I/O module connected directly to an input device having a non-USB interface or the combination of said USB and non-USB security I/O modules.

Said input device preferably includes, but is not limited to, a mouse and/or a keyboard.

Preferably, when said security chip is positioned within an output device, said security I/O module receives encrypted data from the external device and transmits the received data to said encryption/decryption module, or transmits the decrypted data from said encryption/decryption module to the output device.

Said output device preferably includes, but is not limited to, an audio card and/or video card.

Said encryption/decryption module is preferably formed of a SHA/HMAC engine module, a random number generator, a RSA processor module and a key generation module; said SHA/HMAC engine module conducts SHA/HMAC operation on the received data and sends the calculated result to said security I/O module under the control of said processor module; said RSA processor module is controlled by said processor module to conduct RSA operation on the received data and sends the calculated result to said security I/O module; said random number generator is controlled by said processor module to generate random numbers for random key generation; and said key generation module generates keys required by RSA and SHA/HMAC algorithm using the random numbers generated by said random number generator.

Said storage module is preferably formed of a nonvolatile storage for holding key data, user data and programs and a volatile storage for saving temporal data and temporal programs.

A security chip is further provided comprising a processor module, an encryption/decryption module, a storage module, a power detecting module and an I/O interface module, all of which are connected with each other via an internal bus in the security chip, wherein: said processor module controls said encryption/decryption module according to an instruction received from said I/O interface module, sends the instruction processing result to said I/O interface module according to the received instruction or retrieves secret information directly from said storage module and sends it to said I/O interface module; said storage module is configured to store the encryption/decryption key; said I/O interface module is connected to an external device and controlled by said processor module to receive an instruction from the external device and send to the external device the operation result required by the external device; and said power detecting module is controlled by said processor module to detect the power supplied to the security chip; and wherein said security chip further comprises a security I/O module; said encryption/decryption module, under the control of said processor module, retrieves the encryption/decryption key pre-stored in said storage module, encrypts/decrypts the received data with the encryption/decryption key and transmits the encrypted/decrypted data to said security I/O module; said security I/O module is connected directly to the internal bus in the security chip and receives data from the external device; controlled by said processor module, said security I/O module sends the received data to said encryption/decryption module or sends the data from said encryption/decryption module to a device for receiving the information output by an input device or to an output device.

Said security I/O module preferably comprises a security input module, a security output module and a south bridge interface module, wherein: said security input module is connected directly to the internal bus in the security chip, receives encrypted data from an external input device and sends the received data to said encryption/decryption module under the control of said processor module; said south bridge interface module is connected directly to the internal bus in the security chip, receives unencrypted data from an external device and, under the control of said processor module, sends the received data to said encryption/decryption module or sends the decrypted data from said encryption/decryption module to the device for receiving the information output by an input device; said security output module is connected directly to the internal bus in the security chip and transmits the decrypted data from said encryption/decryption module to the output device; and said encryption/decryption module is preferably formed of a SHA/HMAC engine module, a random number generator, a RSA processor module and a key generation module.

Said SHA/HMAC engine module is controlled by said processor module to conduct SHA/HMAC operation on the received data and sends the calculated result to said security output module or said south bridge interface module; said RSA processor module is controlled by said processor module to conduct RSA operation on the received data and sends the calculated result to said security output module or said south bridge interface module; said random number generator is controlled by said processor module to generate random numbers for random key generation; and said key generation module generates keys required by RSA and SHA/HMAC algorithm using the random numbers generated by said random number generator.

Said storage module is preferably formed of a nonvolatile storage for holding key data, user data and programs and a volatile storage for saving temporal data and temporal programs.

Said security input module preferably comprises a USB security input module connected directly to an input device having a USB interface, a non-USB security input module connected directly to an input device having a non-USB interface or the combination of said USB and non-USB security input modules.

Said security input module preferably comprises a mouse security input module connected directly to a mouse, a keyboard security input module connected directly to a keyboard or the combination of said mouse and keyboard security input modules.

The present invention mainly proposes two kinds of security chips, one of which differs from the existing security chip in that it provides a security I/O module in place of an I/O interface module, and the other kind is equipped with a security I/O module as an addition to the existing security chip. By applying the security chips of the present invention to an information processing apparatus, the information input to/output from the information processing apparatus can be encrypted/decrypted for securing the information and thus preventing illegal monitoring and information leakage.

BRIEF DESCRIPTION OF THE DRAWINGS

FIG. 3a shows a security chip applicable to only a USB interface input device according to the present invention.

DETAILED DESCRIPTION OF PREFERRED EMBODIMENTS

Hereafter, the present invention will be further elaborated in conjunction with the diagrams.

Figure 3:
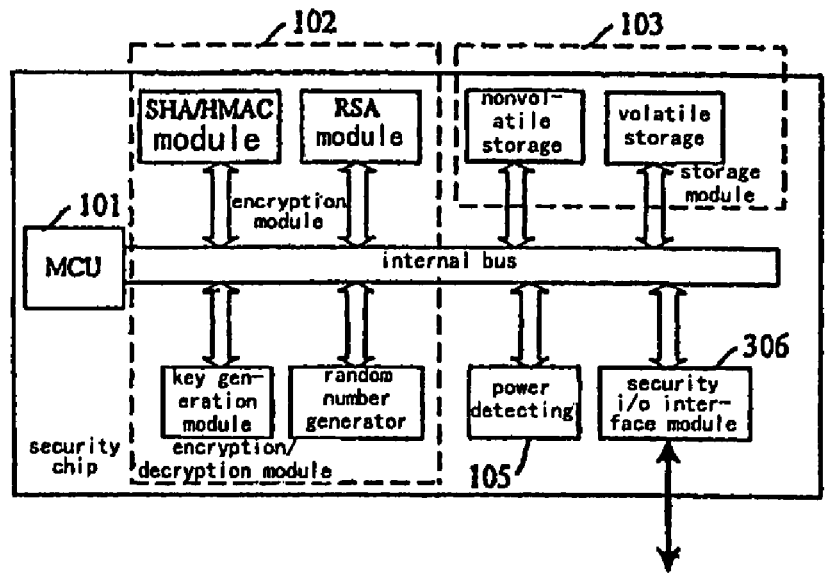
FIG. 3 shows a structural schematic diagram for one kind of security chip provided by the present invention.
Figure 3:
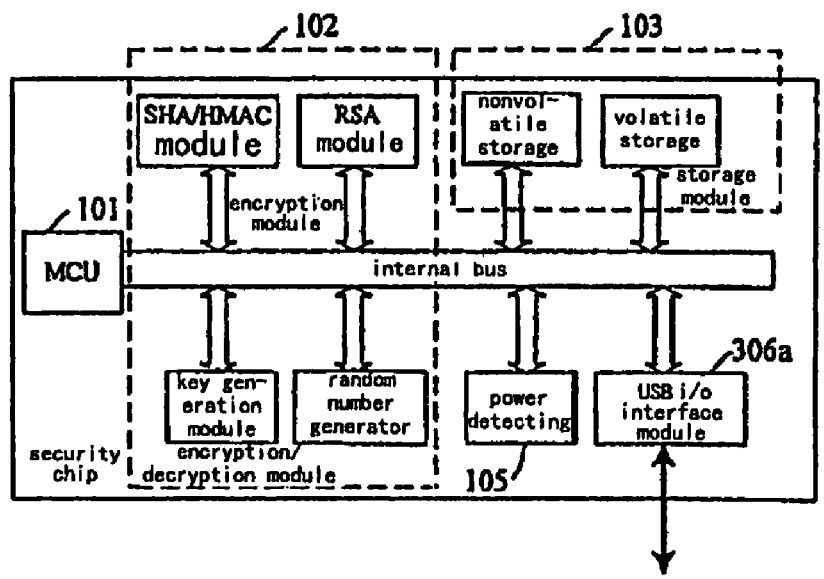

FIG. 3 shows a structural schematic diagram of one kind of security chip provided by the present invention. The security chip comprises a processor module 101, an encryption/decryption module 102, a storage module 103, a power detecting module 105 and a security I/O module 306, all of which are connected with each other via an internal bus in the security chip. The processor module 101, such as MCU, controls the security I/O module 306 to send the received data to the encryption/decryption module 102, or controls the encryption/decryption module 102 to perform encryption/decryption operation and transmit the operation result to the security I/O module 306, or controls the storage module 103 to stores the encryption/decryption key generated by the encryption/decryption module 102. The security I/O module 306 is configured to receive input data from an external device and, under the control of the processor module 101, to send the received data to the encryption/decryption module 102 or transmit the data from the encryption/decryption module 102 to the external device. The storage module 103 is configured to store the encryption/decryption key. The encryption/decryption module 102, under the control of said processor module 101, retrieves the encryption/decryption key pre-stored in the storage module 102, encrypts/decrypts the received data with the encryption/decryption key and transmits the encrypted/decrypted data to the security I/O module 306. The power detecting module 105 is configured to detect the power supplied to the security chip.

The encryption/decryption module 102 comprises a SHA/HMAC engine module, a random number generator, a RSA processor module and a key generation module. The SHA/HMAC engine module is controlled by the processor module 101 to conduct SHA/HMAC operation on the received data and sends the calculated result to the security I/O module 306. The RSA processor module is controlled by the processor module 101 to conduct RSA operation on the received data and sends the calculated result to the security I/O module 306. The random number generator is controlled by the processor module 101 to generate random numbers for random key generation. The key generation module generates keys required by RSA and SHA/HMAC algorithm using the random numbers generated by the random number generator. The storage module is formed of a nonvolatile storage for holding key data, user data and programs and a volatile storage for saving temporal data and programs.

Figure 1:
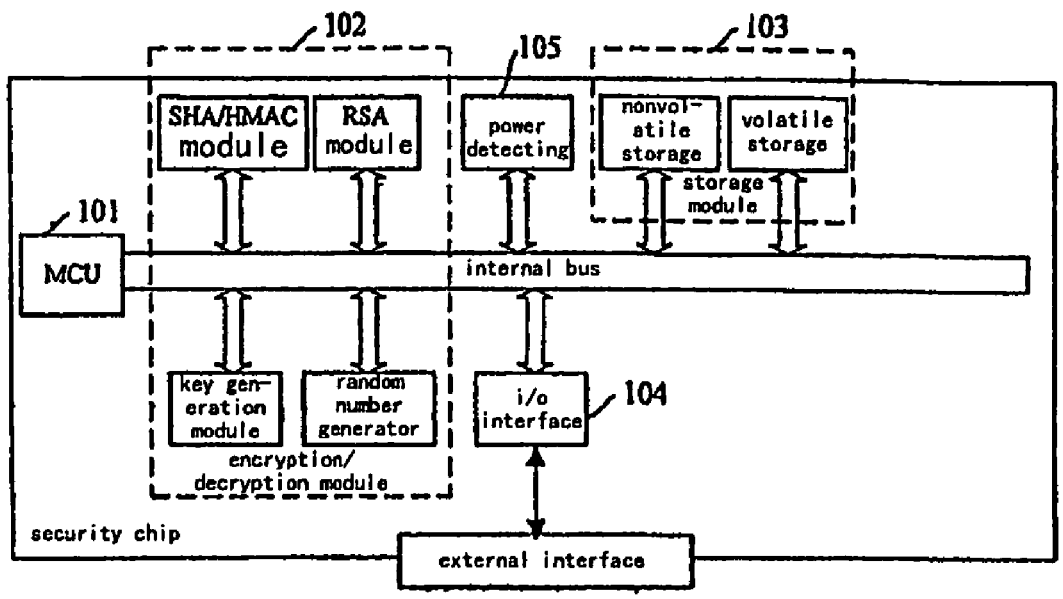
FIG. 1 shows a schematic diagram of the system structure of a security chip specified by TCG.
Figure 2:
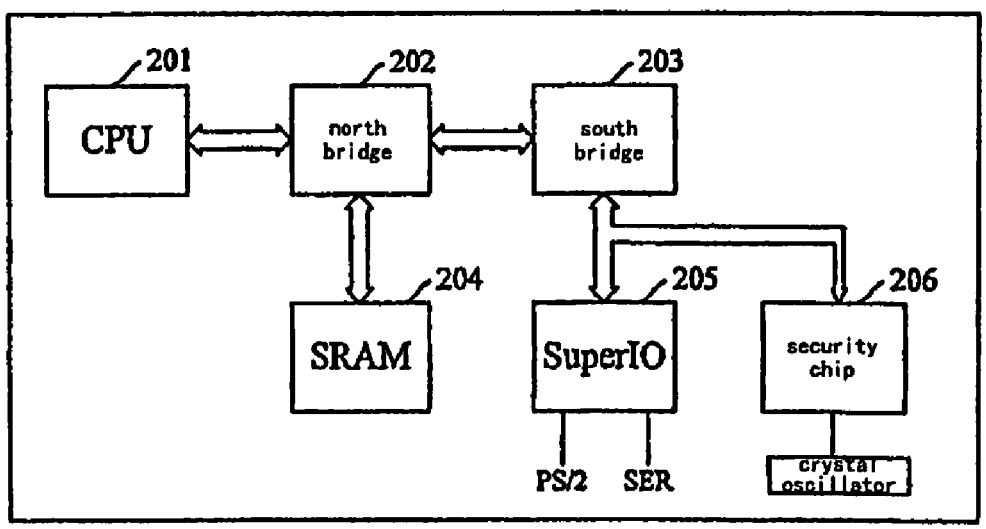
FIG. 2 is a schematic diagram showing the connection between a security chip and a mainboard in the prior art.

The security chip shown in FIG. 3 is commonly located within the input or output device of an information processing apparatus and used for data encryption/decryption exclusively, that is, the security chip do not perform any operation instruction other than that for data encryption/decryption. Therefore, the security chip is basically the same as the existing security chip shown in FIG. 1 except that a security I/O module is added and the I/O interface module is removed.

Figure 3B:
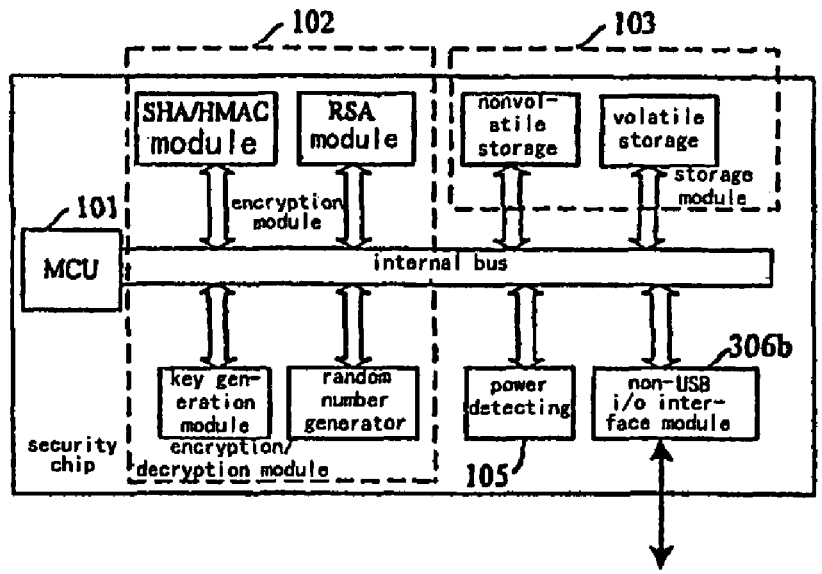
FIG. 3b shows a security chip applicable to only a non-USB interface input device according to the present invention.

When the security chip as shown in FIG. 3 is positioned within an input device, the security I/O module 306 acquires unencrypted data output by the input device and sends the acquired data to the encryption/decryption module 102, or transmits the encrypted data from the encryption/decryption module 102 to an external device. The security I/O module 306 can be either a USB security I/O module 306a exclusively applied in a USB interface input device as shown in FIG. 3a or a is non-USB security I/O module 306b exclusively applied in a non-USB interface input device as shown in FIG. 3b. Further, the security I/O module 306 can be the combination of said USB and non-USB security I/O modules, such as the security I/O module 306c shown in FIG. 3c, which can be adopted in both the input device with a USB interface and the input device without a USB interface. The above-mentioned input device includes, but not limited to, a mouse and/or a keyboard.

When the security chip as shown in FIG. 3 is positioned within an output device, the security I/O module 306 receives encrypted data from the external device and transmits the received data to the encryption/decryption module 102, or transmits the decrypted data from the encryption/decryption module 102 to the output device for display. The above-mentioned output device includes, but not limited to, an audio card and/or a video card.

Figure 4:
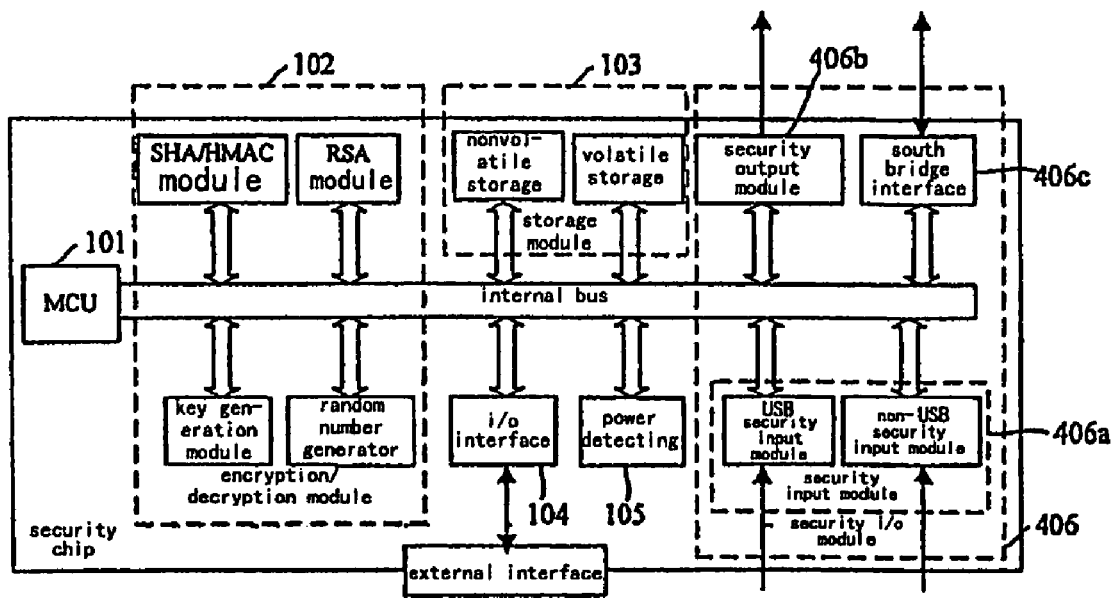
FIG. 4 shows a structural schematic diagram of the other kind of security chip according to the present invention.

FIG. 4 shows a structural schematic diagram for the other kind of security chip provided by the present invention. The security chip comprises a security I/O module 406 in addition to the processor module 101, the encryption/decryption module 102, the storage module 103, the power detecting module 105 and the I/O interface module 104, all of which are connected with each other via an internal bus in the security chip. The I/O interface module 104 is connected to an external device and controlled by the processor module 101 to receive an instruction from the external device and send to the external device the operation result required by the external device. The processor module 101, such as MCU, controls the encryption/decryption module according to an instruction received from the I/O interface module 104, or sends the instruction processing result to the I/O interface module 104 according to the received instruction, or retrieves secret information, such as a key, directly from the storage module 103 and sends it to the I/O interface module 104. The storage module 103 is configured to store the encryption/decryption key. The encryption/decryption module 102, under the control of the processor module 101, retrieves the encryption/decryption key pre-stored in the storage module 103, encrypts/decrypts the received data with the encryption/decryption key and transmits the encrypted/decrypted data to the security I/O module 406. The security I/O module 406 is connected directly to the internal bus in the security chip and receives data from the external device. Controlled by the processor module 101, the security I/O module 406 sends the received data to the encryption/decryption module 102, or sends the data from the encryption/decryption module 102 to a device for receiving the information output by an input device or to an output device.

The security I/O module 406 mentioned above comprises a security input module 406a, a security output module 406b and a south bridge interface module 406c. The security input module 406a receives encrypted data from the input device and sends the received data which is encrypted to the encryption/decryption module under the control of the processor module 101. The security output module 406b transmits the decrypted data from the encryption/decryption module 102 to the output device. The south bridge interface module 406c receives unencrypted data from the external device and, under the control of the processor module 101, sends the received data to the encryption/decryption module 102, or sends the decrypted data from the encryption/decryption module 102 to the device for receiving the information output by the input device.

The encryption/decryption module 102 is commonly formed of a SHA/HMAC engine module, a random number generator, a RSA processor module and a key generation module. The SHA/HMAC engine module is controlled by the processor module 101 to conduct SHA/HMAC operation on the received data and sends the calculated result to the security output module 406b or the south bridge interface module 406c. The RSA processor module is controlled by the processor module 101 to conduct RSA operation on the received data and sends the calculated result to the security output module 406b or the south bridge interface module 406c. The random number generator is controlled by the processor module 101 to generate random numbers for random key generation. The key generation module generates keys required by RSA and SHA/HMAC algorithm using the random numbers generated by said random number generator. The storage module 103 is formed of a nonvolatile storage for holding key data, user data and programs and a volatile storage for saving temporal data and programs.

The security chip shown in FIG. 4 is usually positioned in the mainboard of an information processing apparatus and performs operations related to not only data encryption/decryption but also other instructions concerning the security chip. Therefore, compared with the existing security chip shown in FIG. 1, the inventive security chip has the security I/O module 406 added, in addition to all the functions of the security chip shown in FIG. 1, that is, the security input module 406a, the security output module 406b and the south bridge interface module 406c are additionally provided. The reason for providing the south bridge interface module 406c is to increase data transmission rate.

The above security input module is a USB security input module connected directly to an input device having a USB interface, a non-USB security input module connected directly to an input device having a non-USB interface or the combination of the USB and non-USB security I/O modules. The USB security input module can be a USB mouse security input module connected to a USB mouse, a USB keyboard security input module connected to a USB keyboard or the combination of the USB mouse and keyboard security input modules. A non-USB security input module is configured similarly to the USB security input module.

Naturally, the security input module can also be a mouse security input module connected to a mouse, a keyboard security input module connected to a keyboard or the combination of the mouse and keyboard security input modules. The mouse security input module can be a USB mouse security input module connected to a USB mouse, a non-USB mouse security input module connected to a non-USB mouse or the combination of the USB mouse and the non-USB mouse. A keyboard input module is configured similarly to the mouse security input module.

Meanwhile, the forgoing security output module can be an audio card output module, a video card output module or their combination.

Figure 5:
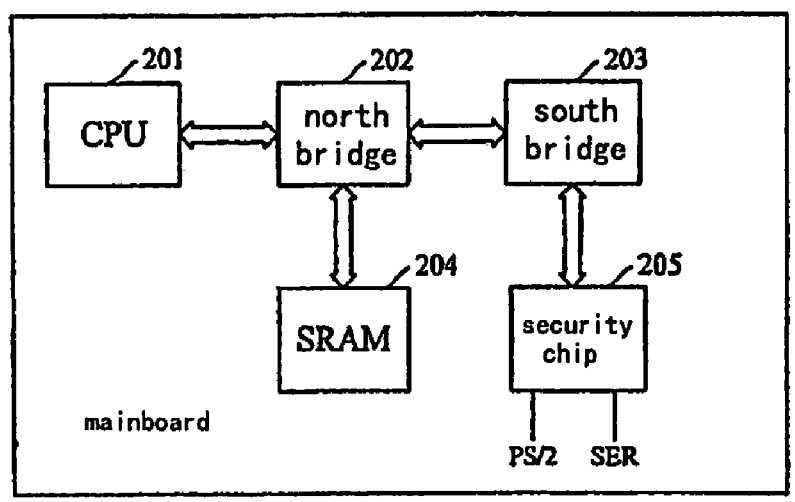
FIG. 5 is a schematic diagram showing the connection between the security chip of FIG. 4 and a mainboard.

FIG. 5 is a schematic diagram showing the connection between the security chip of FIG. 4 and a mainboard. The CPU 201 of an information processing apparatus is connected to a north bridge 202 on the mainboard, and the north bridge 202 is connected directly to a south bridge 203 and a static RAM (SRAM) 204, respectively. To accelerate data transmission rate, data transmission between the south bridge 203 and the security chip 205 is carried out via a dedicated south bridge interface. The security chip 205 is connected directly to input devices, for example, a mouse, a keyboard, etc. Further, the security chip of FIG. 4 can be connected to the mainboard system via a LPC, peripheral component interconnect (PCI), USB, IEEE 1394 or general purpose input/output (GPIO) bus so as to transmit instructions.

Next, a brief description will be given to the application of the above different security chips by example of a computer.

Figure 3C:
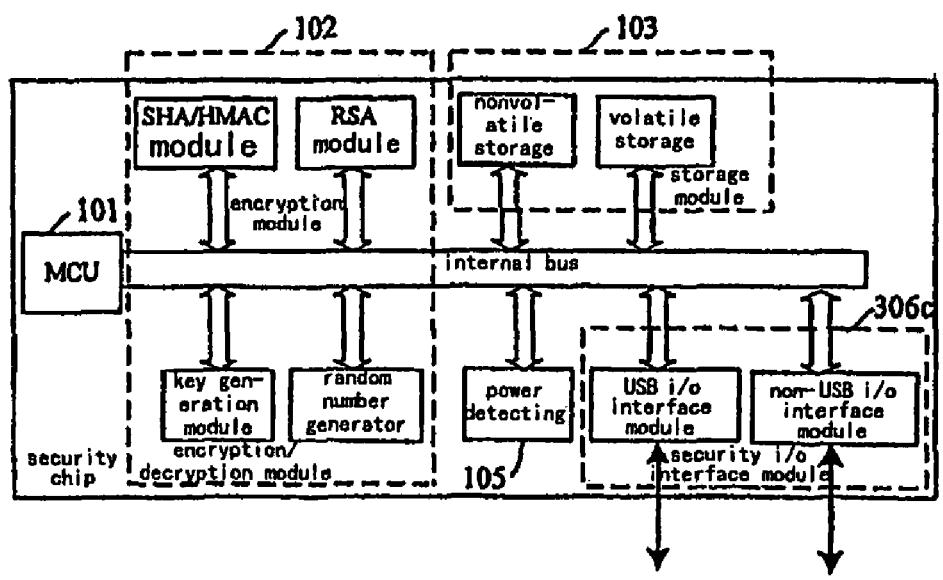
FIG. 3c shows a security chip applicable to a USB interface input device as well as a non-USB interface input device according to the present invention.

The security chip as shown in FIG. 3 is generally provided within each of the input device, such as a mouse and a keyboard, and the output device, such as an audio card and a video card of the computer. Apparently, the security chip within the input device can be as shown in FIG. 3a, 3b or 3c. Furthermore, the security chip shown in FIG. 4 is mounted inside the mainboard of the computer.

The security chip inside the mainboard verifies whether the security chips in the input device and the output device can be trusted, respectively. If the verification is successful, the security chip inside the mainboard cooperates, respectively with the security chips in the input device and the output device to determine and save encryption/decryption keys for encrypting/decrypting data.

The security chip in the input device acquires data to be output by the input device via the security I/O interface, encrypts the acquired data with the above encryption/decryption keys and subsequently sends the encrypted data to the security chip inside the mainboard via the security I/O interface. By using the same encryption/decryption keys as that of the security chip in the input device, the security chip inside the mainboard decrypts the encrypted data received via the security I/O interface and, via the south bridge interface, sends the decrypted data to a device for receiving information output by the input device in the information processing apparatus, which device further carries out subsequent processing.

The security chip inside the mainboard acquires, via the south bridge interface, data to be transmitted to the output device, encrypts the acquired data with the same encryption/decryption keys as that of the security chip in the output device and then sends the encrypted data to the security chip in the output device via the security output interface. By using the same encryption/decryption keys as that of the security chip inside the mainboard, the security chip in the output device decrypts the encrypted data received via the security I/O interface and sends the decrypted data via the security I/O interface to the output device for data output.

The foregoing description gives only the preferred embodiments of the present invention and is not intended to limit the present invention in any way. Thus, any modification, substitution, improvement or like made within the spirit and principle of the present invention should be encompassed by the scope of the present invention.

What is claimed is:

1. An information processing system comprising an input device and a mainboard, a security chip being positioned in the mainboard of the information processing apparatus and another security chip being positioned in the input device, the security chip in the mainboard comprising a processor module, an encryption/decryption module, a storage module, a power detecting module and an input/output (I/O) interface module, all of which are connected with each other via an internal bus in the security chip in the mainboard, wherein:

said processor module controls said encryption/decryption module according to an instruction received from said I/O interface module, or sends an instruction processing result to said I/O interface module according to the received instruction, or retrieves secret information directly from said storage module and sends it to said I/O interface module;

said storage module is configured to store an encryption/decryption key;

said I/O interface module is connected to an external device and controlled by said processor module to receive an instruction from the external device and send to the external device an operation result required by the external device;

said power detecting module is configured to detect power supplied to the security chip under the control of said processing module; and wherein said security chip further comprises an security I/O module, said encryption/decryption module, under the control of said processor module, retrieves an encryption/decryption key pre-stored in said storage module, encrypts/decrypts received data with the encryption/decryption key and transmits the encrypted/decrypted data to said security I/O module;

said security I/O module is connected directly to the internal bus in the security chip and receives data from the external device, wherein said security I/O module comprises a security input module, a security output module and a south bridge interface module, wherein:

said security input module is connected directly to the internal bus in the security chip, receives encrypted data from an external input device and sends received data to said encryption/decryption module under the control of said processor module;

said south bridge interface module is connected directly to the internal bus in the security chip, receives unencrypted data from an external device and, under the control of said processor module, sends the received data to said encryption/decryption module or sends decrypted data from said encryption/decryption module to the device for receiving information output from the input device; and said security output module is connected directly to the internal bus in the security chip and transmits the decrypted data from said encryption/decryption module to the output device;

the security chip in the input device comprising a processor module, an encryption/decryption module, a storage module, a power detecting module and a security input/output (I/O) module, all of which are connected with each other via an internal bus in the security chip in the input device, wherein:

said processor module controls said security I/O module to send received data to said encryption/decryption module, or controls said encryption/decryption module to perform encryption/decryption operation and transmit an operation result to said security I/O module by controlling said encryption/decryption module, or controls said storage module to store an encryption/decryption key generated by said encryption/decryption module;

said security I/O module is configured to acquire unencrypted data output by the input device and send the acquired data to said encryption/decryption module, or transmit encrypted data from said encryption/decryption module to an external device;

said storage module is configured to store the encryption/decryption key;

said encryption/decryption module, under the control of said processor module, retrieves the encryption/decryption key pre-stored in said storage module, encrypts/decrypts received data with the encryption/decryption key and transmits encrypted/decrypted data to said security I/O module, or generates the key required for encryption/decryption operation; and said power detecting module is controlled by said processor module to detect power supplied to the security chip, wherein the security chip in the mainboard verifies whether the security chip in the input device can be trusted; if the verification is successful, the security chip in the mainboard cooperates with the security chip in the input device to determine and save encryption/decryption key for encrypting/decrypting data, wherein the security chip in the input device acquires unencrypted data output by the input device via the security I/O module therein, encrypts the acquired data with the encryption/decryption keys and subsequently sends the encrypted data to the security chip inside the mainboard via the security I/O module, and wherein the security chip inside the mainboard decrypts the encrypted data received via the security I/O module using the same encryption key as that of the security chip in the input device, and, via the south bridge interface module, sends the decrypted data to a device for receiving information output by the input device in the information processing apparatus, which device further carries out subsequent processing.

2. The information processing system according to claim 1, wherein said input device includes a mouse and/or a keyboard.

3. The information processing system according to claim 1, wherein each of said security input modules in the mainboard and in the input device comprises a USB security input module connected directly to an input device having a USB interface, a non-USB security input module connected directly to an input device having a non-USB interface or the combination of said USB and non-USB security input modules.

4. The information processing system according to claim 1, wherein each of said encryption/decryption modules in the mainboard and in the input device is formed of a secure hash algorithm/hashed message authentication code (SHA/HMAC) engine module, a random number generator, a RSA processor module and a key generation module, said SHA/HMAC engine module conducts SHA/HMAC operation on the received data and sends the calculated result to said security output module or said south bridge interface module under the control of said processor module;

said RSA processor module conducts RSA operation on the received data and sends the calculated result to said security output module or said south bridge interface module under the control of said processor module;

said random number generates random numbers for random key generation under the control of said processor module; and said key generation module generates keys required by RSA and SHA/HMAC algorithm using the random numbers generated by said random number generator.

5. The information processing system according to claim 1, wherein each of said storage modules in the mainboard and in the input device is formed of a nonvolatile storage for holding key data, user data and programs and a volatile storage for saving temporal data and temporal programs.

6. An information processing system comprising a mainboard and an output device, a security chip being positioned in the mainboard of the information processing apparatus, and another security chip being positioned in the output device, the security chip in the mainboard comprising a processor module, an encryption/decryption module, a storage module, a power detecting module and an input/output (I/O) interface module, all of which are connected with each other via an internal bus in the security chip in the mainboard, wherein:

said processor module controls said encryption/decryption module according to an instruction received from said I/O interface module, or sends an instruction processing result to said I/O interface module according to the received instruction, or retrieves secret information directly from said storage module and sends it to said I/O interface module;

said storage module is configured to store an encryption/decryption key;

said I/O interface module is connected to an external device and controlled by said processor module to receive an instruction from the external device and send to the external device an operation result required by the external device;

said power detecting module is configured to detect power supplied to the security chip under the control of said processor module; and wherein said security chip further comprises a security I/O module, said encryption/decryption module, under the control of said processor module, retrieves the encryption/decryption key pre-stored in said storage module, encrypts/decrypts the received data with the encryption/decryption key and transmits encrypted/decrypted data to said security I/O module;

said security I/O module is connected directly to the internal bus in the security chip and receives data from the external device; wherein said security I/O module comprises a security input module, a security output module and a south bridge interface module, wherein:

said security input module is connected directly to the internal bus in the security chip, receives encrypted data from an external input device and sends the received data to said encryption/decryption module under the control of said processor module;

said south bridge interface module is connected directly to the internal bus in the security chip, receives unencrypted data from an external device and, under the control of said processor module, sends the received data to said encryption/decryption module or sends the decrypted data from said encryption/decryption module to the device for receiving the information output by an input device; and said security output module is connected directly to the internal bus in the security chip and transmits the decrypted data from said encryption/decryption module to the output device;

the security chip in the output device comprising a processor module, an encryption/decryption module, a storage module, a power detecting module and a security I/O module, all of which are connected with each other via an internal bus in the security chip in the output device, wherein:

said processor module controls said security I/O module to send received data to said encryption/decryption module, or controls said encryption/decryption module to perform encryption/decryption operation and transmit an operation result to said security I/O module by controlling said encryption/decryption module, or controls said storage module to store an encryption/decryption key generated by said encryption/decryption module;

said security I/O module is configured to receive encrypted data from an external device and transmit the received data to said encryption/decryption module, or transmit the decrypted data from said encryption/decryption module to the output device;

said storage module is configured to store the encryption/decryption key;

said encryption/decryption module, under the control of said processor module, retrieves the encryption/decryption key pre-stored in said storage module, encrypts/decrypts the received data with the encryption/decryption key and transmits the encrypted/decrypted data to said security I/I module, or generates the key required for encryption/decryption operation; and said power detecting module is controlled by said processor module to detect power supplied to the security chip, wherein the security chip in the mainboard verifies whether the security chip in the output device can be trusted; if the verification is successful, the security chip in the mainboard cooperates with the security chip in the output device to determine and save encryption/decryption key for encrypting/decrypting data, wherein the security chip inside the mainboard acquires, via the south bridge interface module, data to be transmitted to the output device, encrypts the acquired data with the encryption/decryption keys stored in the storage module and then sends the encrypted data to the security chip in the output device via the security I/O module, and the security chip in the output device decrypts the encrypted data received via the security I/O module using the same encryption/decryption keys as that of the security chip inside the mainboard, and sends the decrypted data via the security I/O module to the output device for data output.

7. The information processing system according to claim 6, wherein each of said encryption/decryption modules in the mainboard and in the output device is formed of a secure hash algorithm/hashed message authentication code (SHA/HMAC) engine module, a random number generator, a RSA processor module and a key generation module, said SHA/HMAC engine module conducts SHA/HMAC operation on the received data and sends the calculated result to said security output module or said south bridge interface module under the control of said processor module;

said RSA processor module conducts RSA operation on the received data and sends the calculated result to said security output module or said south bridge interface module under the control of said processor module;

said random number generates random numbers for random key generation under the control of said processor module; and said key generation module generates keys required by RSA and SHA/HMAC algorithm using the random numbers generated by said random number generator.

8. The information processing system according to claim 6, wherein each of said storage modules in the mainboard and in the input device is formed of a nonvolatile storage for holding key data, user data and programs and a volatile storage for saving temporal data and temporal programs.

9. The information processing system according to claim 6, wherein said output device includes an audio card and/or video card.

* * * * *